W. S. MORTON.
BRAKE FOR MOTOR TRUCKS.
APPLICATION FILED OCT. 30, 1915.
1,274,435.
Patented Aug. 6, 1918.
2 SHEETS—SHEET 1.
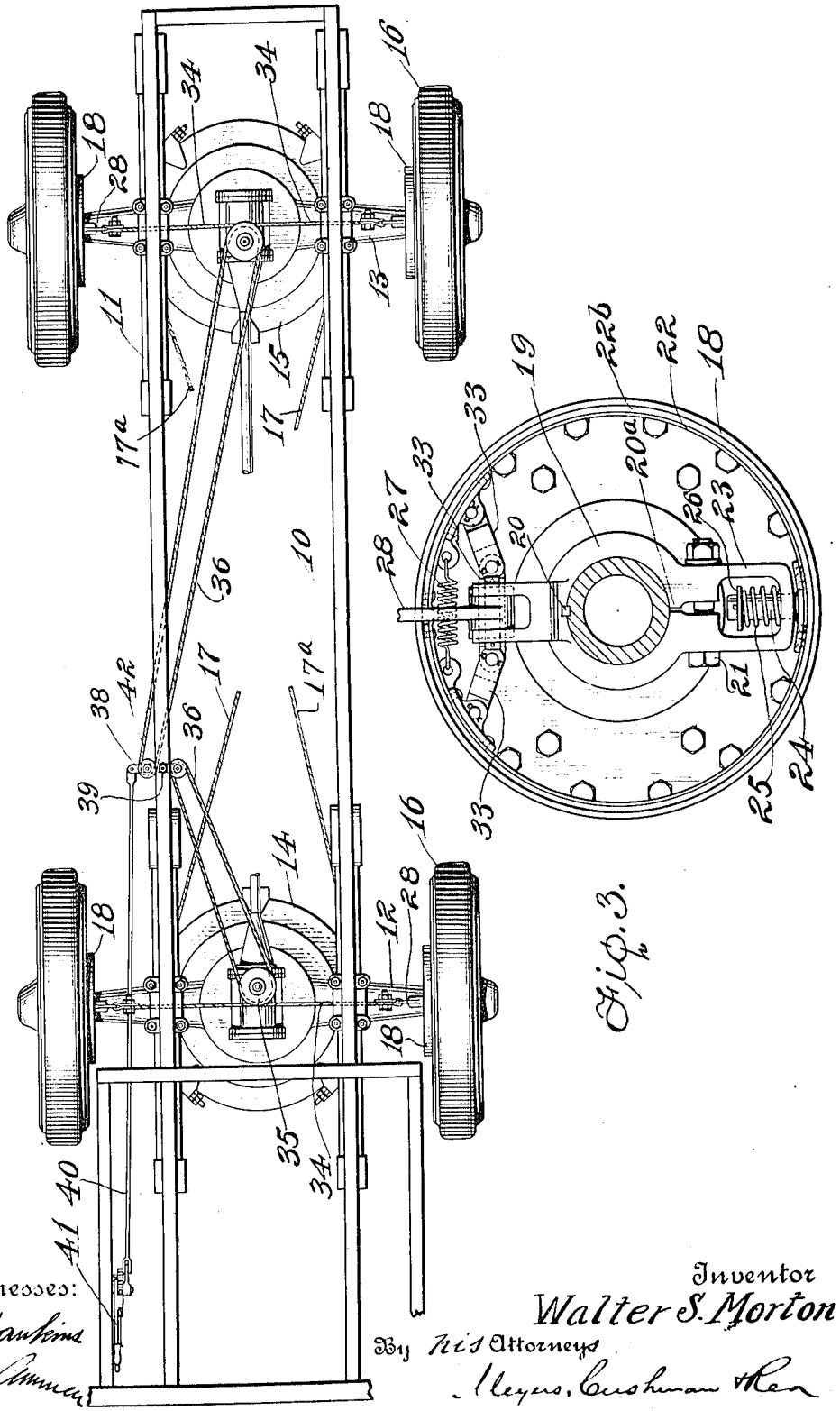
Witnesses:
Inventor
Walter S. Morton
By his Attorneys

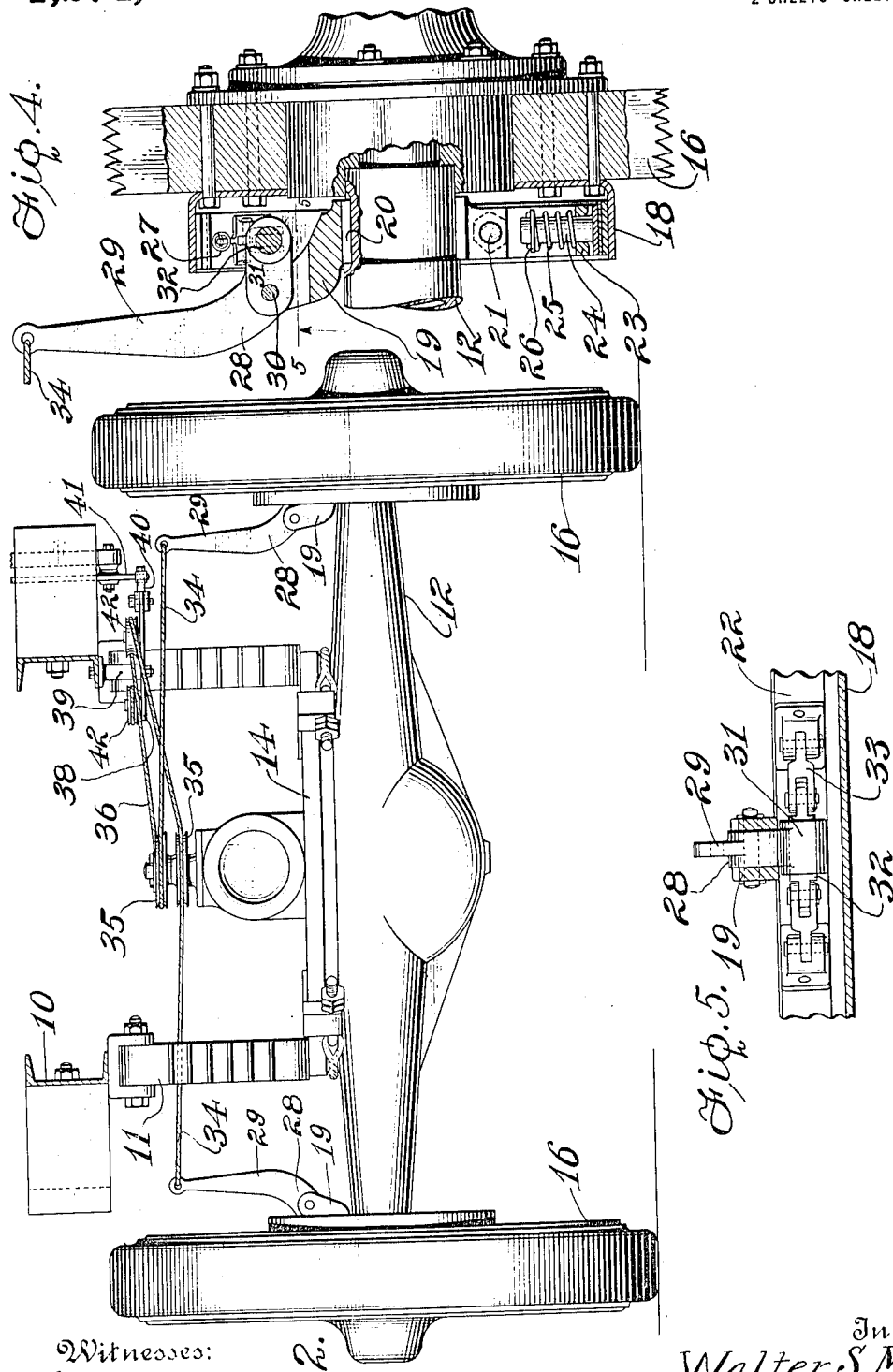

UNITED STATES PATENT OFFICE.

WALTER S. MORTON, OF HARRISBURG, PENNSYLVANIA.

BRAKE FOR MOTOR-TRUCKS.

1,274,435.  Specification of Letters Patent.  Patented Aug. 6, 1918.

Application filed October 30, 1915. Serial No. 58,830.

*To all whom it may concern:*

Be it known that I, WALTER S. MORTON, a citizen of the United States, residing at Harrisburg, in the county of Dauphin and State of Pennsylvania, have invented new and useful Improvements in Brakes for Motor-Trucks, of which the following is a specification.

This invention relates to brake mechanism and while many features of the invention are applicable under various circumstances I have, by way of example, described the brake as applied to an automobile or motor-truck. Such motor-trucks are usually constructed so that one or more of the axles of the truck may swing in a front and rear direction in steering the truck and one of the objects of the present invention is to provide a brake constructed so that the braking power can be readily applied to the wheels at will to stop the truck.

A further object of the invention is to produce a brake mechanism in which all of the wheels may be provided with brakes and in which all the braking power of all the brakes may be readily applied simultaneously.

A further object of the invention is to produce a very simple brake in which the brake member is normally held out of effective frictional engagement with the brake-wheel, but which can be very readily operated to force it into effective frictional engagement with the wheel.

More specifically, the improvements in this regard concern the brake-band, and a further object of the invention is to provide improved means for holding the band normally out of contact with the wheel at an intermediate part and at its ends, and to provide improved means for enabling the brake-band to be forced against the brake-wheel so as to give a good frictional contact throughout the length of the brake-band.

Further objects of the invention will appear hereinafter.

The invention consists in the general combination of parts and features described hereinafter all of which contribute to produce an efficient brake mechanism.

A preferred embodiment of the invention is described in the following specification, while the broad scope of the invention is pointed out in the appended claims.

In the drawing,

Figure 1 is a plan showing parts of a truck and indicating an embodiment of my invention as applied thereto. In this view certain parts are broken away.

Fig. 2 is a cross-section through the truck taken near one of the axles.

Fig. 3 is a vertical cross-section taken through one of the axles adjacent the brake.

Fig. 4 is a vertical section taken through the hub of a wheel and through the brake mechanism corresponding thereto, certain parts being broken away.

Fig. 5 is a horizontal section about on the line 5—5 of Fig. 4 and particularly illustrating a detail of the invention.

The truck which I have illustrated comprises a frame 10 which is supported near its ends on springs 11, said springs being supported on axles 12 and 13 through the medium of fifth-wheels 14 and 15, which enable the axles to swing in a front and rear direction to steer the vehicle. In swinging, each axle moves around the vertical axis of the fifth-wheel corresponding to that axle. Any suitable means may be provided for driving each wheel 16 from a suitable motor. In steering the vehicle, the axles 12 and 13 are controlled by crossed cables 17 and 17$^a$ and any suitable steering mechanism not illustrated which operates to move the parts so as to simultaneously swing the two axles.

I prefer to provide a brake associated with each of the wheels 16 and these brakes preferably all have the same construction. One of these brakes is illustrated in detail in Figs. 3 to 5, inclusive. Each of the brakes comprises a brake-wheel 18 which is preferably attached to the inner face of the wheel 16 near the hub. On the end of the axle such as the axle 12, I provide means for supporting parts of the brake mechanism. This means is preferably in the form of a collar 19 which is attached to the end of the axle near the inner side of the wheel by any suitable means such, as a key 20. The lower side of the collar is preferably split or provided with a slit 20$^a$ adjacent to which a clamping bolt 21 is provided for clamping the collar thereto securely on the axle. Below this point the collar has an extension 23 which forms a guide in a manner which will be described hereinafter for guiding a part of the brake member.

The brake member is preferably in the form of a brake-band 22 which is disposed adjacent the inner face of the brake-wheel 18. An intermediate part of this brake-band is preferably normally held out of frictional engagement with the wheel and this is preferably accomplished at the guide 23 by providing a pin 24 which is attached to the inner face of the brake-band 22 and projects inwardly through the guide 23. The guide 23 is provided with a coil spring 25 disposed around the pin which rests against a washer 26 on the pin and operates normally to hold the intermediate part of the brake-band out of effective frictional engagement with the wheel. The brake-band 22 is preferably provided with a wear strip 22$^b$ which comes in direct contact with the brake-wheel. In order to normally hold the end portions of the brake-band out of effective frictional engagement with the brake-wheel, I prefer to provide a spring 27 which connects the ends of the brake-band (see Fig. 3).

On the collar 19 I support an actuating member for forcing the brake-band 22 firmly into effective frictional engagement with the brake-wheel. This member is preferably in the form of a bell crank lever 28 having an upwardly extending arm 29. The lever is pivoted on a suitable pin 30 and has a short horizontal arm 31 which is preferably connected by a toggle connection with the ends of the brake-band. For this purpose the end of the arm 31 preferably forms a guide for a horizontal loose sliding pin 32, and the ends of this pin are connected by short inclined links 33 to the ends of the brake-band. If the lever arm 29 is pulled inwardly this will evidently elevate the short arm 31 and operate the toggle which is formed by the pin 32 and the links 33. This will tend to expand the band and force the brake outwardly against the brake-wheel throughout the entire length of the band, and the outward movement of the intermediate part of the band will operate to compress the spring 25. When the brake is released, the springs 25 and 27 withdraw the brake-band from effective frictional engagement with the brake-wheel.

In order to operate member 29, I prefer to provide a controlling member which is preferably in the form of a flexible chain or cord 34. This extends inwardly along the axle and preferably over the longitudinal axis of the axle, and I prefer to provide means for supporting and guiding this operating member substantially on the axis of the fifth-wheel about which the axle swings in steering the truck. For this purpose, I provide two horizontal guide pulleys or sheaves 35 which are in axial alinement, with their perimeters lying about tangent to the longitudinal axis of the axle and substantially on the vertical axis of the fifth-wheel. In this way I arrange both of the operating members which correspond to one axle. These operating members are preferably connected together by an integral loop 36 beyond the pulleys 35. I provide means for pulling on these loops simultaneously so as to apply all the brakes at once. This is preferably accomplished by means of a lever 38 supported on a pivot 39 on the frame 10 and connected so as to be operated through a link 40 by a suitable lever or other manually controlled member 41. By exerting a tension in the link 40 the pulleys 42 will cause the loops 36 to exert a tension in the operating members or cords 34 so that all the lever arms 29 will be simultaneously pulled inwardly toward the truck frame. This will apply all the brakes and will distribute the braking force equally throughout all of the wheels. This effect arises of course from the use of the equalizer lever 38 and the use of the loops 36. The use of the equalizer lever, with the axes of pulleys 42 equidistant from the axis of the lever, insures an equal pull in the two loops and the pull in each loop insures an equal pull in the two operating members which are connected with the loops and which correspond with each wheel. In this way I insure that the braking pressure is substantially equal on all the wheels. This minimizes the amount of wear on any particular brake-band.

It will be evident from the arrangement of the brake-operating mechanism described above, that when the axles swing in steering, they do not tend substantially to relax nor put any tension in the operating members 34; hence, the steering of the vehicle does not affect the brakes and the brakes may be applied as readily when the axles are in a steering position as when they are in their normal position.

It is understood that the embodiment of the invention set forth herein is only one of the many embodiments or forms the invention may take, and I do not wish to be limited in the practice of the invention nor in my claims to the particular embodiment set forth.

What I claim is:

1. In a brake mechanism for motor-trucks, in combination, a frame, an axle pivotally mounted on said frame to swing in a front and rear direction, wheels carried by said axle, an independent brake mechanism associated with each wheel and free from coöperation with the wheel tread, each mechanism being located between the frame and the wheel, and means for concurrently actuating said mechanisms in any position the axle may assume in steering the vehicle, said means including a connector extending continuously from one mechanism to the other.

2. In a brake mechanism for motor-trucks, in combination, a frame, a pair of axles pivotally mounted on said frame and connected to swing in a front and rear direction, wheels carried by said axles, independent brake mechanisms associated with each wheel, and means for concurrently actuating the mechanisms of all the wheels in any position the axles may assume in steering the vehicle, said means including an actuator for the mechanisms of the wheels of each axle, and an element to which the several actuators are secured, the movements of which provide the concurrent setting of the mechanisms.

3. In a brake mechanism for motor-trucks, in combination, a frame, an axle pivotally mounted on said frame to swing in a front and rear direction, wheels carried by said axle, a brake associated with each wheel, an operating member for each brake supported substantially on the pivotal axis about which the axle swings in steering, said member being movable in a substantially horizontal plane on an axis corresponding with such pivotal axis, and a control member connected therewith to apply the brakes, the connection of said control member to said operating members operating to apply the brakes simultaneously.

4. In a brake mechanism for motor-trucks, in combination, a frame, an axle pivotally mounted on said frame to swing in a front and rear direction, wheels carried by said axle, a brake associated with each wheel, a flexible member connected to each brake and extending inwardly to substantially the point at which the pivotal axis of the axle is located, guiding means for said flexible member located adjacent to the pivotal axis of the axle, and hand-operated means for simultaneously exerting a pull on said flexible member to apply the brakes simultaneously to said wheels.

5. In a brake mechanism for motor-trucks, in combination, a frame, a pair of axles pivotally mounted on said frame to swing in a front and rear direction, wheels carried by said axles, a brake associated with each wheel, a flexible member connected to the brakes for each wheel of an axle and extending inwardly to a point near the pivotal axis of the axle carrying said wheels, means adjacent the pivotal axis of each axle for supporting and guiding the said flexible member, and hand-operated means for simultaneously exerting tension in all of the flexible members to apply the brakes to all of the wheels simultaneously.

6. In a brake mechanism for motor-trucks, in combination, a frame, a pair of axles pivotally mounted on said frame to swing in a front and rear direction, wheels carried by said axles, a brake associated with each wheel, a flexible member connected with each brake of an axle and extending inwardly to a point near the pivotal axis of the axle corresponding to that wheel, pulleys adjacent the pivotal axes of the axles forming guides for the flexible members, the flexible member for an axle having a loop portion, a lever pivotally supported on said frame and having pulleys engaging the said loops, and means for actuating said lever to pull on the loops and exert a tension in said flexible members to apply all of the brakes simultaneously.

7. In a brake mechanism, in combination, a brake-wheel, a brake member extending along part of the surface of said brake-wheel, means at an intermediate point on said brake member for normally holding the same out of frictional engagement with the wheel, and means for applying a force at two separated points on said brake member to force the same against the wheel throughout substantially the entire area of said brake member, said means including a bell crank lever having its pivoted axis extending transverse to the wheel axis, and a toggle device of which an arm of said lever forms an element.

8. In a brake mechanism, in combination, a brake-wheel, a brake-band disposed adjacent the inner face of said brake-wheel, means for guiding an intermediate part of the brake-band to move toward or away from the brake-wheel, a spring for normally holding the said intermediate part substantially out of frictional engagement with the brake-wheel, a spring connecting the end portions of the brake-band and tending to draw the same away from the wheel, a pivoted bell crank lever for applying the brake, said lever having its axis extending transverse to the wheel axis, and a toggle connection between said lever and the end portions of said brake-band to force the same outwardly and thereby force substantially the entire length of the brake-band into effective frictional engagement with the brake-wheel, an arm of said lever forming an element of the toggle connection.

In testimony whereof I have hereunto set my hand in presence of two subscribing witnesses.

WALTER S. MORTON.

Witnesses:
A. C. WHALEN,
ROBT. L. MORTON.